(12) United States Patent
Hwang (10) Patent No.: US 6,360,854 B1
(45) Date of Patent: Mar. 26, 2002

(54) HYDRAULIC BRAKE SYSTEM (75) Inventor: Cheol-hong Hwang, Mason (KR)

(73) Assignee: HKB Co., Ltd. (KR)

( * ) Notice: Subject to any disclaimer, the term of this patent is extended or adjusted under 35 U.S.C. 154(b) by 0 days.

(21) Appl. No.: 09/553,688

(22) Filed: Apr. 21, 2000

(30) Foreign Application Priority Data

Feb. 2, 2000 (WO) .............................. PCT/KR00/00081

(51) Int. Cl.$^7$ ............................ B60T 11/10; B60T 7/00; B60T 10/02; F16D 57/02
(52) U.S. Cl. ........................ 188/151 R; 303/2; 303/10; 303/61; 188/290
(58) Field of Search ..................... 188/151 R, 290–296; 303/10, 61, 2; 123/321, 90.17

(56) References Cited

U.S. PATENT DOCUMENTS

| | | | |
|---|---|---|---|
| 1,658,960 A | * | 2/1928 | Adams |
| 5,368,137 A | | 11/1994 | Clemens |
| 5,462,137 A | * | 10/1995 | Aubry et al. |
| 5,465,817 A | * | 11/1995 | Muscatell |
| 6,102,490 A | * | 8/2000 | Ko |

FOREIGN PATENT DOCUMENTS

| KR | 1998-0015382 | 5/1998 |
|---|---|---|
| KR | 1999-0178774 | 3/1999 |

OTHER PUBLICATIONS

International Search Report prepared by Korean Industrial Property Office dated May 15, 2000.

\* cited by examiner

*Primary Examiner*—Douglas C. Butler (57) ABSTRACT

An hydraulic brake system that rapidly and precisely slows or reduces speed by constraining or stopping the movement of a link mechanism connected between a piston and a rotational driving shaft of a power system with physical force generated due to the incompressible fluid characteristic by constraining or stopping the flow of oil filled in an hydraulic oil chamber. The hydraulic brake system includes a lubricating section for supplying the oil reserved in a protective casing to friction sliding parts of respective components through pumping movement by utilizing the reciprocal movement of a piston rod, and an oil supplement section for supplementing the hydraulic oil chamber with the oil. Accordingly, the possible abrasion of the respective friction sliding parts is constrained, and the durability is improved. Further, in the event of an oil leakage, the oil is supplemented for emergency-braking, so that a possible accident can be prevented. Also, by employing a journal bearing of a labyrinth hydraulic packing at the friction sliding parts, anti-abrasion is significantly improved.

10 Claims, 7 Drawing Sheets

HYDRAULIC BRAKE SYSTEM

BACKGROUND OF THE INVENTION

1. Field of the Invention

The present invention relates to a brake system for slowing or stopping a rotational driving shaft of a power system, and more particularly to a hydraulic brake system for accurately slowing or stopping a rotational driving shaft of a power system with a physical force which is produced due to an incompressible fluid characteristic.

2. Description of the Prior Art

The patent application for a hydraulic brake system which is capable of solving general problems of a conventional friction brake device has been filed by the same applicant with the Korean Industrial Property Office on Oct. 7, 1996 (Application Ser. No. 96-044192), and granted a patent on Nov. 25, 1998 (Patent No.: 178774) which will be described briefly below.

According to the Korean Patent No. 178774, the hydraulic brake system includes a casing having a hydraulic oil inlet which is opened/closed by a bolt type cover, a piston section which is a sliding member disposed in the casing and has a piston shaft whose both ends protrude outward, a hydraulic pressure controlling ball valve disposed in a hydraulic oil passage in the casing for controlling the flow rate of hydraulic oil, a controlling lever which is a pivot member mounted on the outer surface of the casing for controlling the hydraulic pressure controlling ball valve, a movement section for driving the controlling lever, a brake section connected to the rear end of the piston shaft of the piston device for stopping the rotational driving shaft, and a protective box for surrounding the casing and brake device.

The hydraulic brake system constructed as above normally permits the hydraulic oil reserved in the hydraulic oil chamber to flow without any disturbance. Then when the brake is operated, by disturbing or stopping the hydraulic oil flow by operating the hydraulic pressure controlling ball valve, the hydraulic brake system slows or stops the rotational driving shaft of the power system through the brake section with a physical force which is produced due to the resistance or stoppage of the hydraulic oil flow, and thereby performs an efficient brake operation. Accordingly, even after a long period of continuous using time, the brake system has no problems such as breakage or non-operation. Further, in this brake system which is constructed by a new concept quite different from the conventional friction brake system, since there is no need to employ brake pads, there is no inconvenience of replacing the brake pads. Also, without having to employ a servo assisted brake, the hydraulic brake system can precisely perform the brake operation by only one process.

The above hydraulic brake system, however, has a shortcoming of having abrasions between friction sliding sections and accordingly a low persistence, since it has no lubricating structure for the friction sliding sections of the piston and brake sections.

Further, since the above hydraulic brake system has no safety device employed for any abnormal events such as hydraulic oil leakage, etc., the brake operation can not be performed when an abnormality occurs, accordingly having the high possibility of allowing an accident.

Further, since a link of the brake section and the piston shaft of the piston section are connected with each other by a guiding member which is generally in the shape of a shaft, unnecessary rolling occurs in addition to the reciprocal linear movement of the piston shaft. Accordingly, the piston shaft is curved by excessive force exerted thereto, and brake force is inaccurately controlled.

SUMMARY OF THE INVENTION

The present invention has been developed to overcome the above-mentioned problems of the prior art, and accordingly it is an object of the present invention to provide a hydraulic brake system capable of controlling abrasions between friction sliding sections by lubricating means for supplying oil for lubrication to the respective friction sliding members.

Another object of the present invention is to provide a hydraulic brake system capable of not only controlling the flow rate of hydraulic oil in the reservoir, but also supplementing hydraulic oil for an emergency brake operation in the event of a hydraulic oil leakage.

Still another object of the present invention is to provide a hydraulic brake system capable of controlling the brake force more accurately by transmitting link movement into the accurate reciprocal linear movement of the piston section.

The above object is accomplished by a hydraulic brake system according to the present invention, including: a hydraulic oil reservoir having a hydraulic oil chamber filled with hydraulic oil; a piston device disposed in the hydraulic oil reservoir for being reciprocally and linearly moved; a link device disposed between the piston device and an eccentric cam formed on the rotational driving shaft of the power system, the link device moving in accordance with the rotation of the rotational driving shaft in a manner of tracing a circular arc path upward and downward and forward and backward; a connecting device for connecting the link device and the piston device in a manner that the link device and the piston device are moved in relation to each other; a flow rate controlling section disposed in the hydraulic oil passage of the hydraulic oil reservoir for selectively stopping the piston device by controlling the flow rate of hydraulic oil; a protective casing for holding, thus supporting the above-mentioned respective components, the protective casing filled with hydraulic oil; and a lubricating section for pumping hydraulic oil of the protective casing to the friction sliding sections of the rotational driving shaft, the link device, and the connecting device, respectively.

Such a hydraulic brake system according to the present invention slows or stops the rotational driving shaft by disturbing or stopping the flow of the hydraulic oil of hydraulic oil chamber by using a flow rate controlling section, and accordingly stopping the piston device and thus restricting the link device which is moved in relation to the piston device.

According to a preferred embodiment of the present invention, the link device includes a large-diameter section connected with the eccentric cam of the rotational driving shaft and a small-diameter section which is tapered. Further, the link device is bisected by the centerline of the eccentric cam of the rotational driving shaft into first and second link members, which are fastened by a pair of screws. Accordingly, the link device can be assembled more easily.

The connecting device includes a connecting member having a connecting hole through which the piston rod is connected, and a tapered connecting section connected with the small-diameter section of the link device for transmitting the movement of the link device into the reciprocal linear movement of the piston rod; a first guiding member fastened to the inner wall of the protective casing, having a guiding section accommodated in a sliding hole formed on the upper portion of the connecting member, the first guiding member for guiding the sliding movement of the connecting member from both sides of the connecting member; and a second guiding member having first and second guiding holes to which first and second guiding protrusions, respectively, protruding from the lower side of the connecting hole of the connecting member and from the middle portion of the connecting portion are accommodated, the second guiding member being fastened to the first guiding member by a plurality of screws. Accordingly, undesired force to other directions different from the linear direction of the piston rod is not applied, and bending of the piston rod is prevented, and the brake force is controlled more accurately.

The lubricating section includes: a second cylinder having a hydraulic oil suction hole and a discharge hole formed thereon vertically opposite to each other, the second cylinder extending from a side of the cylinder; a second piston extending from the piston to be inserted into and withdrawn out of the second cylinder according to the reciprocal linear movement of the piston for forming suction and discharging pressure in the second cylinder; a hydraulic oil suction pipe connected to the hydraulic oil suction hole of the second cylinder for conveying hydraulic oil of the protective casing to the interior of the second cylinder by the suctioning pressure of the second cylinder; a hydraulic oil feeding pipe disposed between the hydraulic oil discharge hole of the second cylinder and friction sliding sections of the above-mentioned respective components; and back flow preventing check valves respectively disposed in the hydraulic oil suction hole and the discharge hole of the second cylinder. Since hydraulic oil is supplied to the respective friction sliding sections for lubrication, possible abrasions of the friction sliding sections are prevented, and inner persistence of the system is improved.

According to another preferred embodiment of the present invention, the hydraulic brake system further includes a hydraulic oil supplementing section for supplementing hydraulic oil of the hydraulic oil reservoir in the event of a hydraulic oil leakage.

The hydraulic oil supplementing section includes: a secondary hydraulic oil reservoir disposed on the inner upper side of the protective casing for sucking in the hydraulic oil of the protective casing, and for reserving the sucked hydraulic oil therein; a hydraulic oil feeding pipe for connecting the secondary hydraulic oil reservoir and the hydraulic oil chamber of the hydraulic oil reservoir; and a valve disposed around the hydraulic oil feeding pipe for selectively blocking the hydraulic oil supply.

The valve includes: a valve body having upper and lower valve holes which have a plurality of slits radially formed thereon; and a ball positioned in the lower valve hole of the valve body at a predetermined distance from the upper valve hole for closing the valve hole by being elevated when the pressure of the hydraulic oil reservoir increases. Accordingly, consistent amount of hydraulic oil is maintained in the hydraulic oil reservoir, and hydraulic oil is automatically supplemented in the event of a hydraulic oil leakage for an emergency brake operation.

According to another preferred embodiment, brake forces are exerted to two portions of the rotational driving shaft of the power system. Accordingly, greater brake force is obtained, and more accurate and balanced brake operation is guaranteed.

BRIEF DESCRIPTION OF THE DRAWINGS

The above objects and advantages will be more apparent by describing the present invention with reference to the accompanying reference drawings, in which.

DETAILED DESCRIPTION OF THE PREFERRED EMBODIMENT

FIGS. 1 to 5 show a hydraulic brake system according to a preferred embodiment of the present invention.

In the drawings, a reference numeral 1 refers to a rotational driving shaft of a power system, 10 is a protective casing, 20 is a hydraulic oil reservoir, 30 is a piston device, 40 is a link device, 50 is a connecting device, 60 is flow rate controlling means, 70 is lubricating means, and 80 is hydraulic oil supplementing means.

Figure 1:
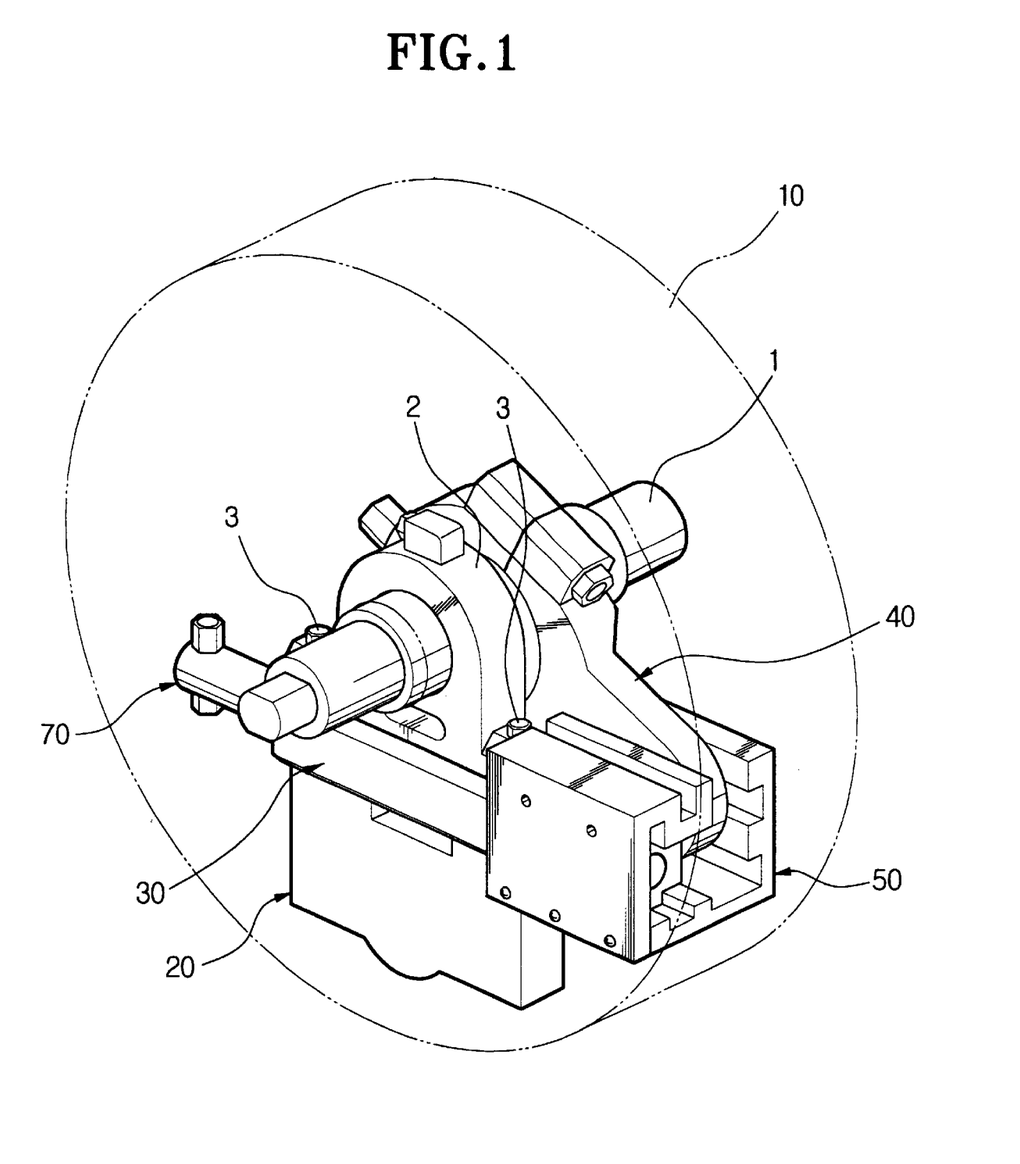
FIG. 1 is a perspective view for schematically showing a hydraulic brake system according to a preferred embodiment of the present invention.
Figure 2:
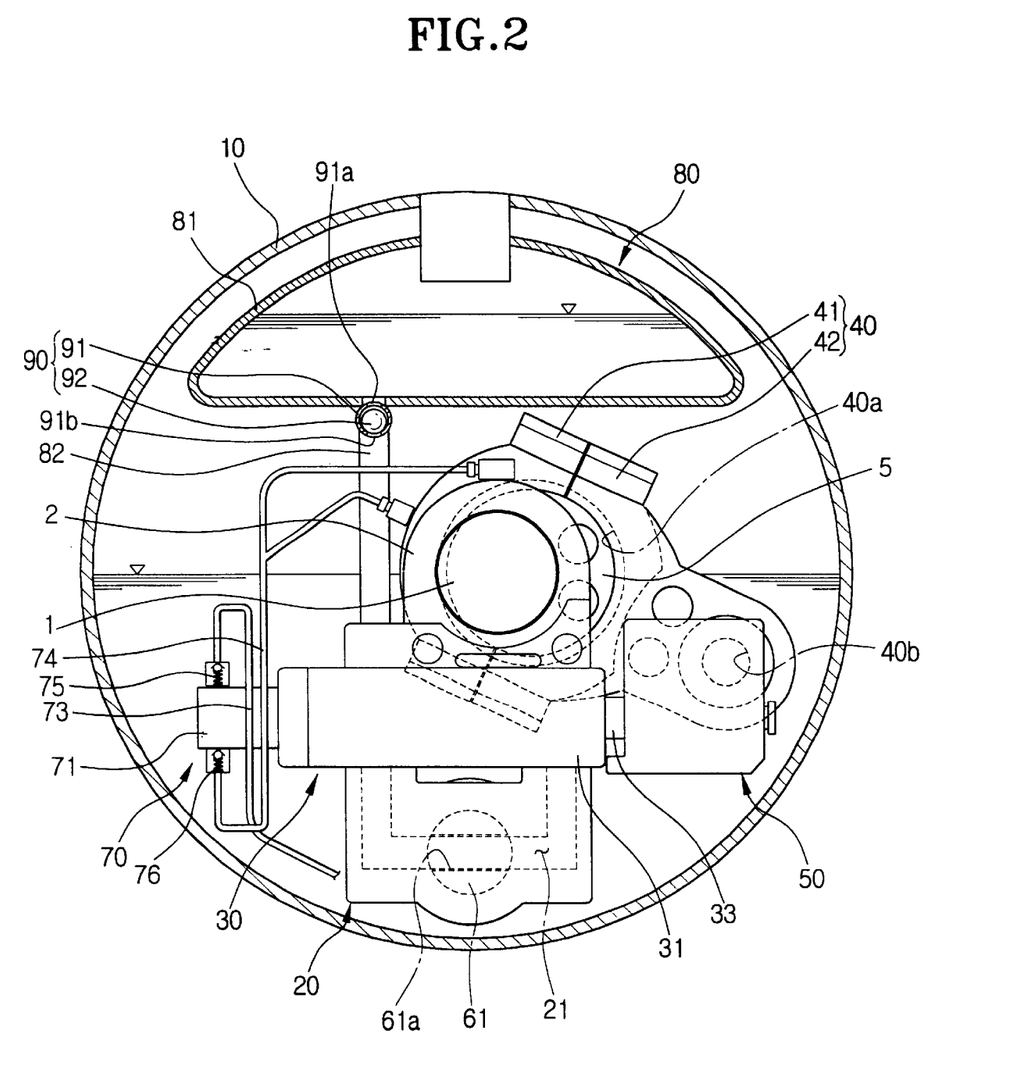
FIG. 2 is a front sectional view for explaining the structure and operation of the hydraulic brake system according to the present invention.

As shown in FIGS. 1 and 2, a rotational driving shaft 1 of the power system is integrally formed with a circular eccentric cam 5.

Figure 3:
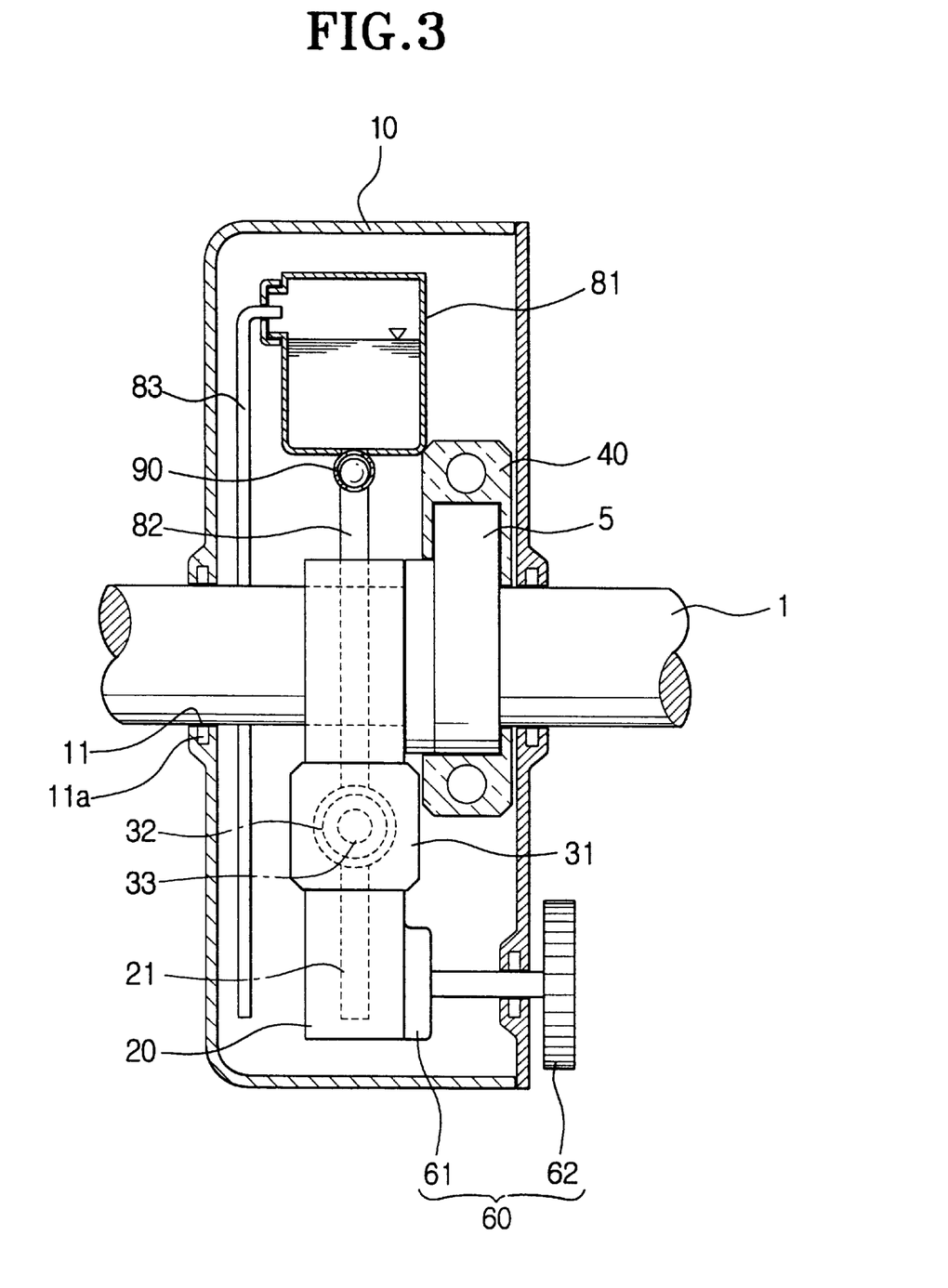
FIG. 3 is a side sectional view of FIG. 2.
Figure 4:
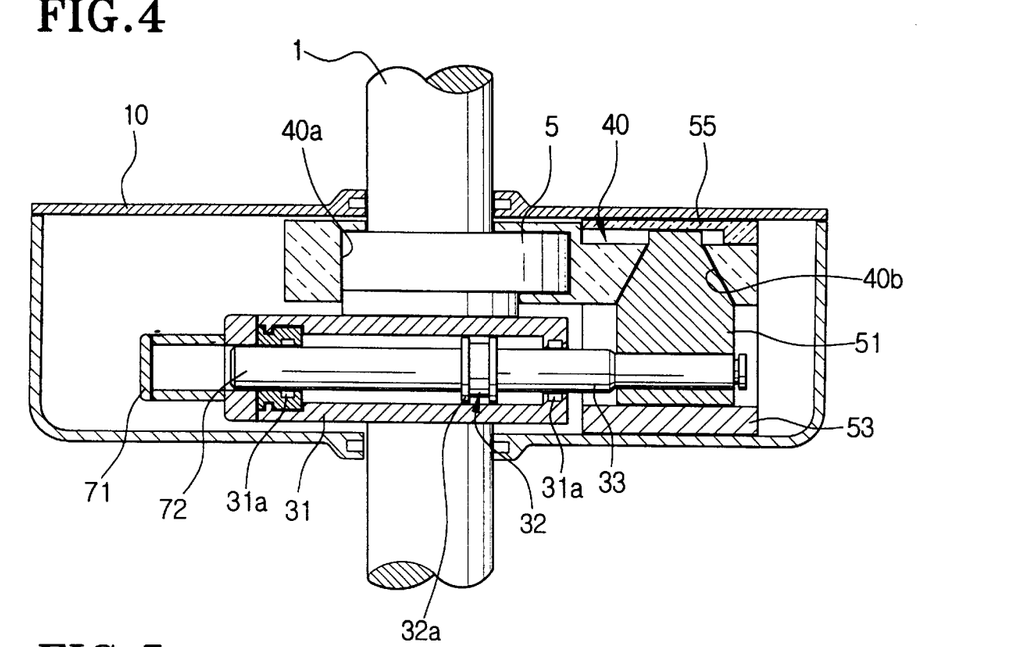
FIG. 4 is a plan sectional view of FIG. 2.

As shown in FIGS. 3 and 4, the protective casing 10 is in the shape of cylinder at a predetermined width having closed ends, and surrounds, thus protects various components such as the hydraulic oil reservoir 20, piston device 30, link device 40, connecting device 50, flow rate controlling means 60, lubricating means 70, and hydraulic oil supplementing means 80, etc.

The protective casing 10 includes a shaft hole 11 formed in the center portion thereof, through which the rotational driving shaft 1 is passed. Further, about half of the protective casing 10 is filled with hydraulic oil. A sealing member 11a is disposed around the shaft hole 11 for preventing hydraulic oil leakage.

The hydraulic oil reservoir 20 includes a hydraulic oil chamber 21 filled with hydraulic oil, and a semi-circular bracket 2 fixed by a plurality of bolts 3 above the hydraulic oil reservoir 20 for rotatably supporting the rotational driving shaft 1.

The piston device 30 includes a cylinder 31 formed across the hydraulic oil chamber 21 of the hydraulic oil reservoir 20, a piston 32 slidably disposed within the cylinder 31, and a piston rod 33 protruding from the piston 32 outside the cylinder 31.

There are sealing members disposed around the front and rear sides of the cylinder 31 for preventing hydraulic oil leakage, and a compressing ring 32a disposed around the outer circumference of the piston 32 for preventing hydraulic oil flow to another direction.

The link device 40 is disposed between the eccentric cam 5 of the rotational driving shaft 1 and the piston rod 33 of the piston device 30. When the rotational driving shaft 1 is rotated, the link device 40 is moved by the eccentric cam 5 tracing a circular arc path upward and downward, and forward and backward, and accordingly, the piston device 30 connected with the link device 40 is reciprocally and linearly moved. When the piston device 30 is stopped, the link device 40 which is connected with the piston device 30 is also stopped, and the rotational driving shaft 1 is slowed down, or stopped.

The link device 40 includes a large-diameter section 40a connected with the eccentric cam 5 of the rotational driving shaft 1, and a small-diameter section 40b connected with the connecting section of a connecting device 50, both of which will be described later. The small-diameter section 40b is tapered for load dispersion. Further, there are journal bearing made of special purpose metal disposed around the respective inner circumferences of the large and small diameter sections 40a and 40b for an efficient rotation with the respective corresponding parts thereof The link device 40 is bisected by the centerline of the eccentric cam 5 into two separate link members 41 and 42, respectively, for an easier assembling of the rotational driving shaft 1 with respect to the eccentric cam 5. These two link members 41 and 42 are fastened by a pair of screws, respectively.

Figure 5:
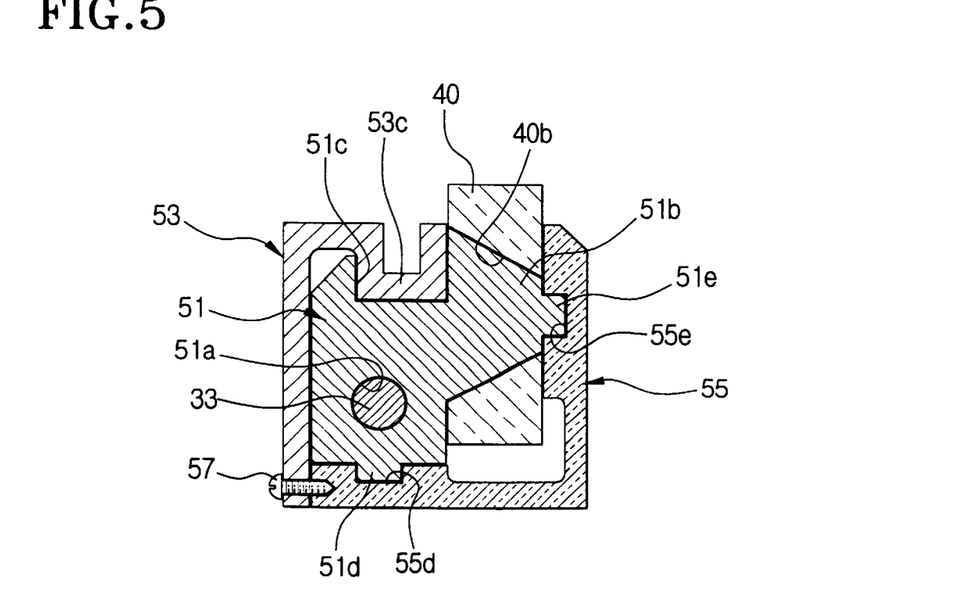
FIG. 5 is a sectional view for showing one example of the connecting section for connecting a link section and a piston section of the hydraulic brake system according to the preferred embodiment of the present invention.

The connecting device 50 connects the link device 40 with the piston device 30, for transmitting the movement of the link device 40 into the accurate reciprocal linear movement of the piston device 30. As shown in FIG. 5, the connecting device 50 includes first and second guiding members 53 and 55. The connecting member 51 includes a connecting hole 51a to which the piston rod 33 is connected, and a tapered connecting section 51b which is inserted into the small-diameter section 40b of the link device 40. Further, a sliding hole 51c is formed in the upper portion of the connecting member 51, and first and second guiding protrusions 51d and 51e protrude from the lower portion of the connecting hole 51a and the middle portion of the connecting section 51b, respectively. Meanwhile, the first and second guiding members 53 and 55 guide the sliding movement of the connecting member 51 from both sides of the connecting member 51. Here, the first guiding member 53 is connected to the inner wall of the protective casing 10, and the second guiding member 55 is fastened to the first guiding member 53 by a plurality of screws 57. The first guiding member 53 includes a guiding section 53c accommodated in the sliding hole 51c of the connecting member 51, and the second guiding member 55 includes first and second guiding holes 55d and 55e in which the first and second guiding protrusions 51d and 51e are slidably accommodated.

The flow rate controlling means 60 is disposed on the hydraulic oil passage formed in the hydraulic oil reservoir 20, and selectively stops the piston rod 33 of the piston device 30 by disturbing or stopping the hydraulic oil flow. The flow rate controlling means 60 includes a valve 61 having a valve hole 61a which is aligned with the hydraulic oil passage of the hydraulic oil reservoir 20, and a valve opening/closing means 62 for narrowing the opening degree of the valve hole 61a or blocking the valve hole 61 a by rotating the valve 61.

The lubricating means 70 supplies hydraulic oil as a lubricating oil to the respective friction sliding sections of the respective components, such as to the contact areas between the rotational driving shaft 1 and the bracket 2, large-diameter section 40a of the link device 40 and the eccentric cam 5, small-diameter section 40b of the link device 40 and the connecting device 50, and connecting device 50, etc., by pumping the hydraulic oil of the protective casing 10 using reciprocal linear movement of the piston device 30. By the lubricating means 70, abrasions between the respective friction sliding sections are minimized, and accordingly, the persistence of the device is improved.

The lubricating means 70 includes a second cylinder 71, a second piston 72, a hydraulic oil suction pipe 73, a hydraulic oil feeding pipe 74, and two back flow preventing check valves 75 and 76. The second cylinder 71 extends from the cylinder 31 of the piston device 30, and has a hydraulic oil suction hole and a discharge hole formed therein vertically opposite to each other. The second piston 72 extends from the piston 32 of the piston device 30. By the reciprocal linear movement of the piston 32, the second piston 72 is inserted into and withdrawn out of the second cylinder 71, forming suction and discharge pressure within the second cylinder 71. Further, the hydraulic oil suction pipe 73 is connected with the hydraulic oil suction hole of the second cylinder 71 to permit hydraulic oil of the protective casing 10 to flow into the second cylinder 71 by the suction pressure of the second cylinder 71. Further, the hydraulic oil feeding pipe 74 connects the discharge hole of the second cylinder 71 with the respective friction sliding sections of the above-mentioned components, respectively. The two back flow preventing check valves 75 and 76 are disposed in the hydraulic oil suction hole and discharge hole of the second cylinder 71 for preventing both hydraulic oil discharge through the hydraulic oil suction hole, and hydraulic oil suction through the hydraulic oil discharge hole.

The hydraulic oil supplementing means 80 is a safety device which supplements hydraulic oil of the hydraulic oil reservoir 20 to the hydraulic oil chamber 21, thereby enabling emergency brake operation in the event of a leakage of hydraulic oil of the hydraulic oil reservoir 20.

The hydraulic oil supplementing means 80 includes a secondary hydraulic oil reservoir 81 formed at the upper inner portion of the protective casing 10 which is connected to the hydraulic oil chamber 21 of the hydraulic oil reservoir 20 through the hydraulic feeding pipe 82 to supplement hydraulic oil to the hydraulic chamber 21. The secondary hydraulic oil reservoir 81 is connected with a hydraulic oil suction pipe 83 which extends toward the lower portion of the protective casing 10. The hydraulic oil of the protective casing 10 is sucked through the hydraulic oil suction pipe 83 by the pressure difference of the secondary hydraulic oil reservoir 81, and is reserved in the second hydraulic oil reservoir 81 at a consistent amount. There is a valve 90 disposed around the hydraulic oil feeding pipe 82 for selectively blocking hydraulic oil fed into the hydraulic oil chamber 21 of the hydraulic oil reservoir 20 through the hydraulic oil feeding pipe 82. The valve 90 includes a valve body 91 in the shape of hollow sphere 91, and a ball 92. Valve holes 91a and 91b are formed above and below the valve body 91, respectively, and a plurality of slits are radially formed on the lower valve hole 91b. Further, the ball 92 is positioned in the lower valve hole 91b having a predetermined gap from the upper valve hole 91a. In such a situation, the hydraulic oil is fed into the hydraulic oil chamber 21 through a plurality of open slits, and the amount of hydraulic oil can be maintained consistently in the hydraulic oil chamber 21. When the brake pressure is applied to the hydraulic oil chamber 21, the ball 92 is elevated by the pressure to close the upper valve hole 91a. Accordingly, normal brake pressure is applied to the hydraulic oil chamber 21, and the brake operation is performed.

Hereinafter, the operation of the hydraulic brake system constructed as above according to the present invention will be described.

During the normal operation of a power system, as the rotational driving shaft 1 is rotated, the link device 40 connected to the eccentric cam 5 of the rotational driving shaft 1 is moved, tracing a circular arc path upward and downward, and forward and backward. Such a movement of the link device 40 is transmitted to the piston device 30 through the connecting device 50, and accordingly, the piston device 30 is reciprocally and linearly moved. Here, since the hydraulic oil passage of the hydraulic oil chamber 21 is open, the reciprocal linear movement of the piston device 30 is smoothly performed with a smooth flow of hydraulic oil.

Then in order to slow or stop the rotational driving shaft 1, by operating the valve 61 disposed on the hydraulic oil passage, the flow rate of hydraulic oil is reduced, and flow resistance occurs due to the incompressible fluid characteristic. Accordingly, the piston rod 33 is slowed down, and the movement of the link device 40 connected to the piston rod 33 is also restricted, and rotational speed of the rotational driving shaft 1 is reduced.

Meanwhile, by operating the valve 61 to a maximum extent, the hydraulic oil passage is closed, and hydraulic oil flow is stopped. Accordingly, the piston rod 33 is stopped, and the movement of the link device 40 is completely restricted, and the rotational driving shaft 1 is stopped.

During the above brake operation, there can be abrasions at the respective friction sliding sections of the respective components, such as at the friction sliding sections of the rotational driving shaft 1 and bracket 2, link device 40 and eccentric cam 5, and the connecting device, etc., since excessive weight is applied thereto. According to the present invention, however, since the hydraulic oil of the protective casing 10 is pumped to the respective friction sliding sections by the lubricating means 70, such abrasions are minimized.

Further, in the event of hydraulic oil shortage, since hydraulic oil is supplemented from the hydraulic oil reservoir 20 to the secondary hydraulic oil reservoir 81, a consistent amount of hydraulic oil can be maintained. Such an oil supplementation is also performed in the event of oil leakage for the emergency brake operation.

Figure 6:
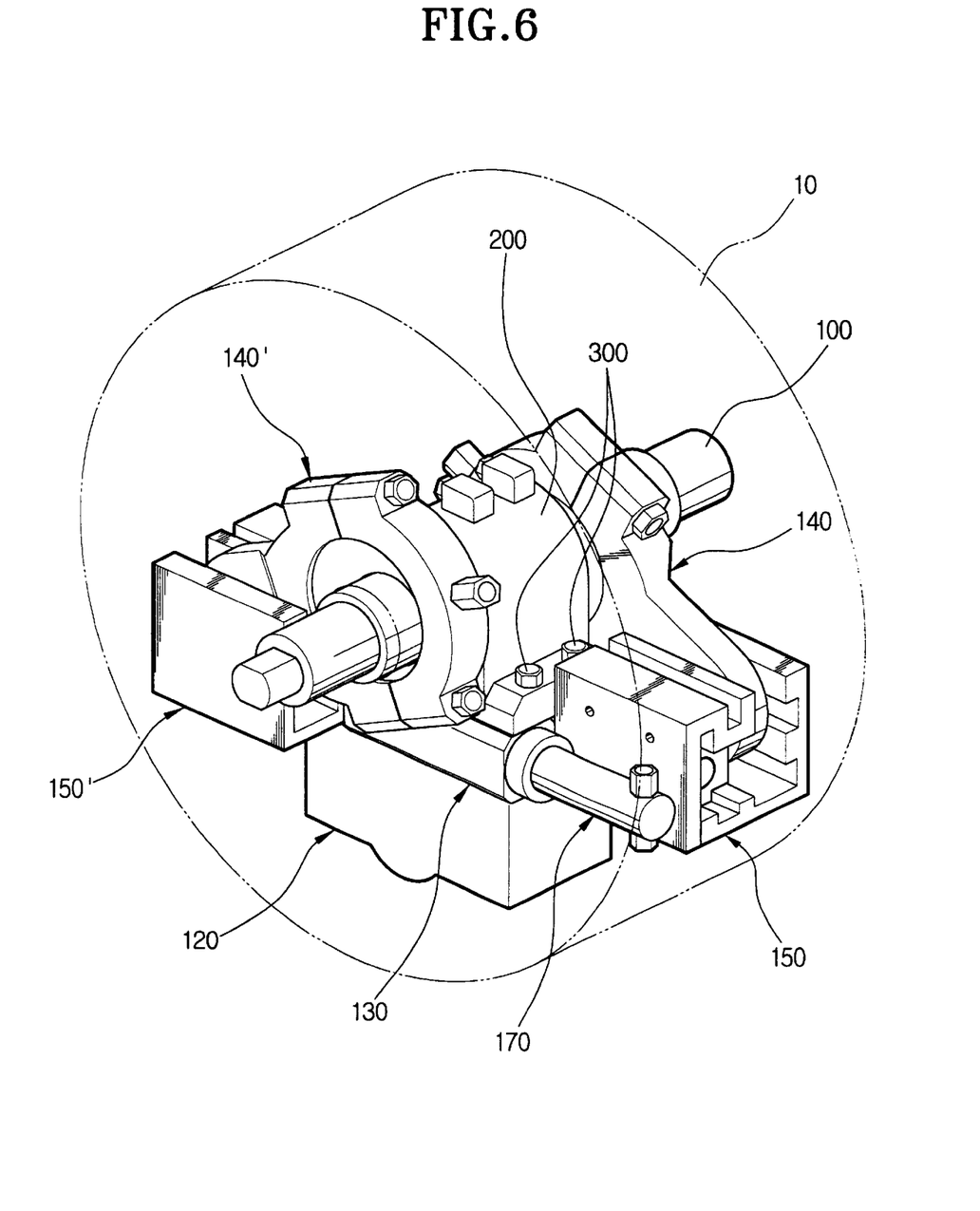
FIG. 6 is a perspective view of a hydraulic brake system according to another preferred embodiment of the present invention.
Figure 7:
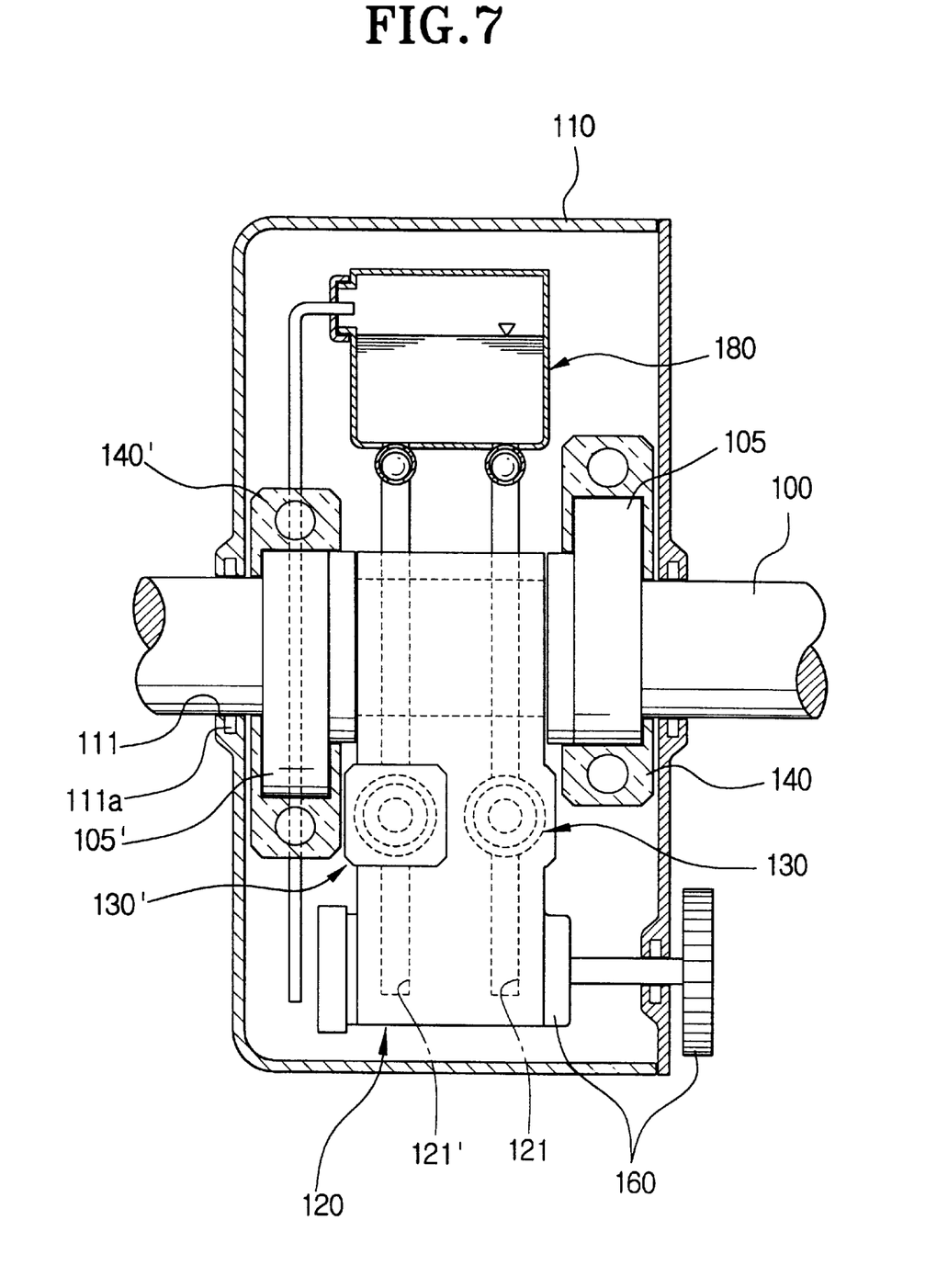
FIG. 7 is a sectional view corresponding to FIG. 3, for explaining the structure and operation of the hydraulic brake system according to another preferred embodiment of the present invention.
Figure 8:
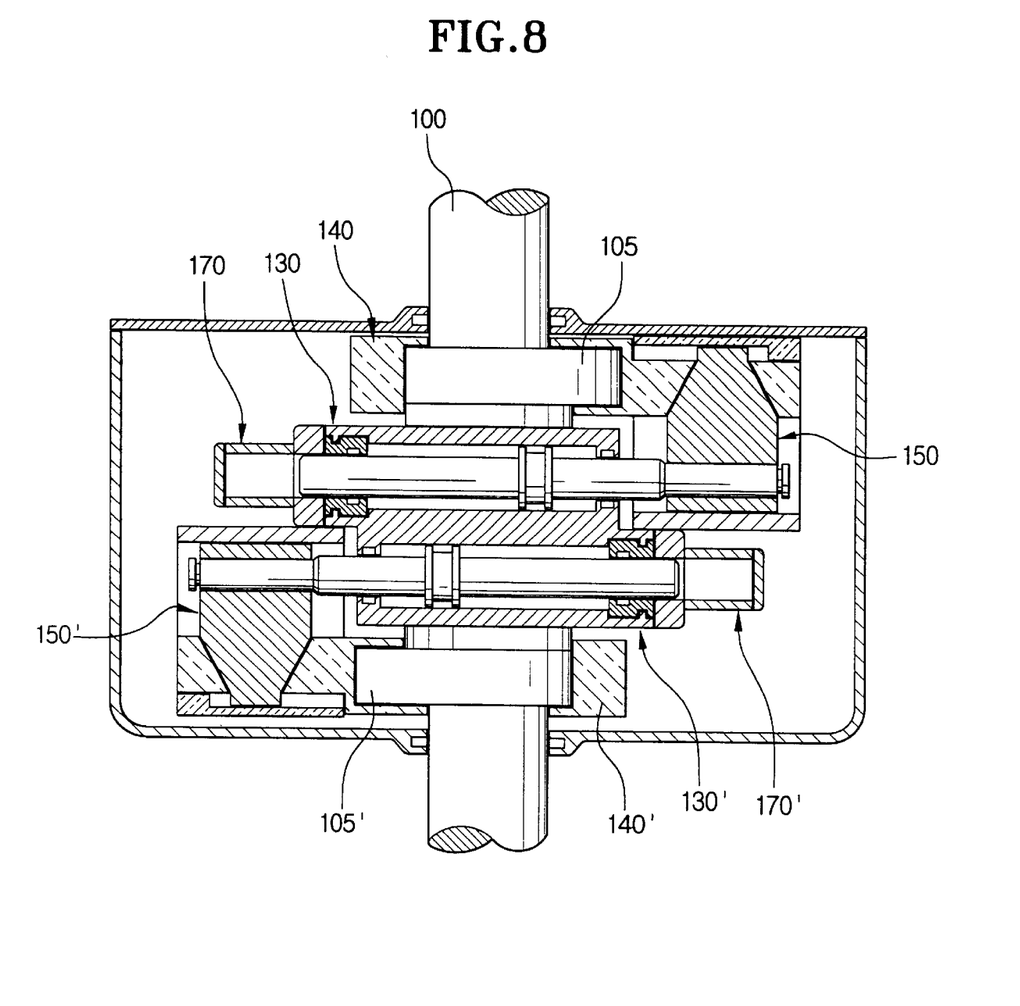
FIG. 8 is a sectional view corresponding to FIG. 4, for explaining the structure and operation of the hydraulic brake system according to another preferred embodiment of the present invention.

Meanwhile, as shown in FIGS. 6 to 8, the hydraulic brake system according to the present invention has greater brake force by its structure for exerting brake force to two portions of the rotational driving shaft 100. Such will be described in greater detail with reference to the hydraulic brake system according to another preferred embodiment of the present invention.

As shown in FIGS. 6 to 8, the rotational driving shaft 100 of the power system includes a pair of circular plate eccentric cams 105 and 105' formed thereon at a predetermined distance from each other. The pair of eccentric cams 105 and 105' are eccentrically formed around the rotational driving shaft 100 horizontally opposite to each other with respect to the rotational driving shaft 100.

The protective casing 110 includes a shaft hole 111 through which the rotational driving shaft 100 is passed. Further, half of the protective casing 110 is filled with hydraulic oil, and a sealing member 111a is disposed around the shaft hole 111 for preventing hydraulic oil leakage.

The hydraulic oil reservoir 120 includes two hydraulic oil chambers 121 and 121' filled with hydraulic oil. Above the hydraulic reservoir 120, there is a bracket 200 fixed by a plurality of bolts 300 for rotatably supporting the rotational driving shaft 100.

Further, the hydraulic oil reservoir 120 includes two piston devices 130 and 130' corresponding to the hydraulic oil chambers 121 and 121', to be reciprocally and linearly moved from opposite directions of the hydraulic oil reservoir 120, respectively.

Further, between the eccentric cams 105 and 105' of the rotational driving shaft 100 and the two piston devices 130 and 130', link devices 140 and 140 are disposed, respectively. The link devices 140 and 140 and the piston devices 130 and 130' are connected with each other by connecting devices 150 and 150' to be moved in relation to each other. Accordingly, when the rotational driving shaft 100 is rotated, the link devices 140 and 140' whose one ends are connected to the eccentric cams 105 and 105' are moved by tracing the circular arc path upward and downward, and forward and backward, and accordingly, the piston devices 130 and 130, which are connected with the other ends of the link devices 140 and 140' through the connecting devices 150 and 150', are reciprocally and linearly moved.

The flow rate controlling means 160 is disposed on the hydraulic oil passage formed in the hydraulic oil reservoir 110, for selectively stopping the piston devices 130 and 130' by disturbing or stopping the flow of hydraulic oil. Accordingly, the movement of the link devices 140 and 140' connected with the piston devices 130 and 130, which are moved in relation to the link devices 140 and 140', is restricted, and the rotational driving shaft 100 is slowed, or stopped. Here, the flow rate controlling means 160 simultaneously opens/closes the two hydraulic oil passages of the hydraulic oil chambers 121 and 121 in the hydraulic oil reservoir 110.

Further, the hydraulic brake system according to another preferred embodiment of the present invention includes two lubricating means 170 and 170' for pumping hydraulic oil of the protective casing 110 to the friction sliding sections of the respective components by using reciprocal linear movement of the piston devices 130 and 130', and hydraulic oil supplementing means 180 for supplementing hydraulic oil from the hydraulic oil reservoir 120 in the event of a hydraulic oil leakage. Here, the hydraulic oil supplementing means 180 supplies hydraulic oil to the two hydraulic oil chambers 121 and 121' of the hydraulic oil reservoir 120.

Description of other structures and components will be omitted since the same have been described above in the description of the preferred embodiment of the present invention. By the same reason, their respective brake operations will be also omitted.

The unique feature of another preferred embodiment of the present invention lies in the structure for exerting brake force to the two portions of the rotational driving shaft 100, which has the effects of greater brake force, accuracy, and balance.

Although another preferred embodiment describes a structure for exerting brake force to two portions of the rotational driving shaft, it is not strictly limited thereto, but can have variations, such as exerting brake forces to three, four, or more portions of the rotational driving shaft.

As described above, according to the present invention, during the operation of the hydraulic brake system, since hydraulic oil of the protective casing is pumped by reciprocal linear movement of the piston device to the friction sliding sections of the respective components for lubrication thereof, abrasions of the respective components in contact with the friction sliding sections are controlled, and persistence of the brake system is improved.

Further, according to the present invention, since the link device and the piston device are connected with each other in a manner that the movement of the link device is transmitted to the piston device exclusive of other unnecessary forces to another directions, undesired results such as bending of piston rod of the piston device, etc., can be prevented, and more accurate brake operation can be performed.

Further, according to the present invention, due to the means for supplementing the hydraulic oil of the hydraulic oil reservoir to the hydraulic oil chamber, a consistent amount of hydraulic oil can be maintained in the hydraulic oil chamber. Also, in the event of a hydraulic oil leakage, hydraulic oil can be supplemented for emergency brake operation, so that risk of accident is prevented.

Meanwhile, in the hydraulic brake system according to another preferred embodiment of the present invention, since brake force is applied to two portions of the rotational driving shaft, greater brake force can be obtained, and more accurate and balanced brake operation is also guaranteed.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A hydraulic brake system for slowing or stopping a rotational driving shaft of a power system with a physical force which is produced by disturbing or stopping the flow of hydraulic oil, comprising:
    a hydraulic oil reservoir having a hydraulic oil chamber filled with hydraulic oil;
    a piston device disposed in the hydraulic oil reservoir for being reciprocally and linearly moved;
    a link device disposed between the piston device and an eccentric cam formed on the rotational driving shaft of the power system, the link device moving in accordance with the rotation of the rotational driving shaft in a manner of tracing a circular arc path upward and downward and forward and backward;
    a connecting device for connecting the link device and the piston device in a manner that the link device and the piston device are moved in relation to each other;
    flow rate controlling means disposed in the hydraulic oil passage of the hydraulic oil reservoir for selectively stopping the piston device by controlling the flow rate of hydraulic oil;
    a protective casing for holding, thus supporting the above-mentioned respective components, the protective casing filled with hydraulic oil; and
    lubricating means for pumping hydraulic oil of the protective casing to friction sliding sections of the rotational driving shaft, the link device, and the connecting device, respectively.

2. The hydraulic brake system as claimed in claim 1, wherein the piston device comprises:
    a cylinder formed across the hydraulic oil chamber of the hydraulic oil reservoir;
    a piston slidably disposed in the cylinder; and
    a piston rod protruding from the piston to the outside of the cylinder.

3. The hydraulic brake system as claimed in claim 2, wherein the link device comprises a large-diameter section connected with the eccentric cam of the rotational driving shaft and a small-diameter section which is tapered, the link device being bisected by the centerline of the eccentric cam into first and second link members which are fastened by a plurality of screws.

4. The hydraulic brake system as claimed in claim 3, wherein the connecting device comprises:
    a connecting member having a connecting hole through which the piston rod is connected, and a tapered connecting section connected with the small-diameter section of the link device, for transmitting a movement of the link device into a reciprocal linear movement of the piston rod;
    a first guiding member fastened to the inner wall of the protective casing, the first guiding member having a guiding section accommodated in a sliding hole formed on the upper portion of the connecting member, the first guiding member for guiding the sliding movement of the connecting member from both sides of the connecting member; and
    a second guiding member having first and second guiding holes to which first and second guiding protrusions, respectively, protruding from the lower side of the connecting hole of the connecting member and from the middle portion of the connecting portion are accommodated, the second guiding member being fastened to the first guiding member by a plurality of screws.

5. The hydraulic brake system as claimed in claim 2, wherein the lubricating means comprises:
    a second cylinder having a hydraulic oil suction hole and a discharge hole formed therein vertically opposite to each other, the second cylinder extending from a side of the cylinder;
    a second piston extending from the piston to be inserted into and withdrawn out of the second cylinder according to the reciprocal linear movement of the piston for forming suction and discharging pressure in the second cylinder;
    a hydraulic oil suction pipe connected to the hydraulic oil suction hole of the second cylinder for conveying the hydraulic oil of the protective casing to the interior of the second cylinder by the suctioning pressure of the second cylinder;
    a hydraulic oil feeding pipe disposed between the hydraulic oil discharge hole of the second cylinder and friction sliding sections of the above-mentioned respective components; and
    back flow preventing check valves respectively disposed in the hydraulic oil suction hole and the discharge hole of the second cylinder.

6. The hydraulic brake system as claimed in claim 1, wherein the flow rate controlling means comprises:
    a valve having a valve hole aligned with the hydraulic oil passage, the valve being rotatably disposed in the hydraulic oil passage in the hydraulic oil reservoir; and
    valve opening/closing means for narrowing the opening degree of the valve hole or closing the valve hole by rotating the valve.

7. The hydraulic brake system as claimed in claim 1, further comprising hydraulic oil supplementing means for supplementing the hydraulic oil of the hydraulic oil reservoir in the event of hydraulic oil leakage.

8. The hydraulic brake system as claimed in claim 7, wherein the hydraulic oil supplementing means comprises:
    a secondary hydraulic oil reservoir disposed on the inner upper side of the protective casing for sucking in the hydraulic oil of the protective casing, and for reserving the sucked hydraulic oil therein;

a hydraulic oil feeding pipe for connecting the secondary hydraulic oil reservoir and the hydraulic oil chamber of the hydraulic oil reservoir; and a valve disposed around the hydraulic oil feeding pipe for selectively closing the hydraulic oil supply.

9. The hydraulic oil system as claimed in claim 8, wherein the valve comprises:

a valve body having upper and lower valve holes, the valve holes having a plurality of slits radially formed thereon; and a ball positioned in the lower valve hole of the valve body at a predetermined distance from the upper valve hole for closing the valve hole by being elevated when the pressure of the hydraulic oil reservoir increases.

10. A hydraulic brake system for slowing or stopping a rotational driving shaft of a power system with a physical force which is produced by disturbing or stopping the flow of hydraulic oil, comprising:

a hydraulic oil reservoir having at least two hydraulic oil chambers filled with hydraulic oil;

at least two piston devices disposed in the hydraulic oil reservoir corresponding to the respective hydraulic oil chambers for being reciprocally and linearly moved from opposite directions;

two link devices disposed between the piston device and eccentric cams which are formed around the rotational driving shaft of the power system at a predetermined distance from each other, the link devices moving in accordance with the rotation of the rotational driving shaft while tracing a circular arc path upward and downward and forward and backward;

two connecting devices for connecting the link devices and the piston devices corresponding to the link devices in a manner that the link devices and the piston devices are moved in relation to each other;

flow rate controlling means disposed in the hydraulic oil passage of the hydraulic oil reservoir for selectively stopping the piston devices by controlling the flow rate of hydraulic oil;

a protective casing for holding, thus supporting the above-mentioned respective components, the protective casing filled with hydraulic oil;

lubricating means for pumping the hydraulic oil of the protective casing to friction sliding sections of the rotational driving shaft, the link devices, and the connecting devices, respectively; and lubricating oil supplementing means for supplementing the hydraulic oil from the hydraulic oil reservoir in the event of hydraulic oil leakage.

* * * * *